(12) United States Patent
Thom et al.

(10) Patent No.: US 11,182,484 B2
(45) Date of Patent: Nov. 23, 2021

(54) TRUSTED EXECUTION BROKER

(71) Applicant: Microsoft Technology Licensing, LLC, Redmond, WA (US)

(72) Inventors: Stefan Thom, Snohomish, WA (US); Brian Telfer, Seattle, WA (US); Deepu C. Thomas, Bellevue, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 391 days.

(21) Appl. No.: 16/237,434

(22) Filed: Dec. 31, 2018

(65) Prior Publication Data
US 2020/0210585 A1    Jul. 2, 2020

(51) Int. Cl.
  *H04L 9/00*    (2006.01)
  *G06F 21/57*    (2013.01)
  *G06F 8/41*    (2018.01)
  *G06F 9/50*    (2006.01)
  *G06F 21/44*    (2013.01)
  *G06F 21/71*    (2013.01)
  *H04L 29/06*    (2006.01)
  *H04L 29/08*    (2006.01)

(52) U.S. Cl.
  CPC ............... *G06F 21/57* (2013.01); *G06F 8/41* (2013.01); *G06F 9/5072* (2013.01); *G06F 21/44* (2013.01); *G06F 21/71* (2013.01); *H04L 63/20* (2013.01); *H04L 67/2809* (2013.01)

(58) Field of Classification Search
  CPC .......... G06F 21/44; G06F 21/53; G06F 21/57; G06F 21/71; H04L 63/20
  See application file for complete search history.

(56) References Cited

U.S. PATENT DOCUMENTS

2010/0313189 A1  12/2010  Beretta et al.
2014/0096182 A1*  4/2014  Smith .................... H04L 67/10
                                                    726/1
2018/0096412 A1   4/2018  Scott-Nash et al.

OTHER PUBLICATIONS

"International Search Report and Written Opinion Issued in PCT Application No. PCT/US19/066680", dated Mar. 25, 2020, 10 Pages.

* cited by examiner

*Primary Examiner* — Beemnet W Dada
(74) *Attorney, Agent, or Firm* — Holzer Patel Drennan

(57) ABSTRACT

Trusted execution of a workload payload is brokered among multiple trusted execution platforms. The workload payload is received from a source computing system and includes input data, trusted execution code, and one or more trusted execution policies. At least one of the multiple trusted execution platforms is selected based on the one or more trusted execution policies. A brokered payload is generated to include executable trusted execution code and the input data. The brokered payload is communicated to the selected at least one trusted execution platform. A brokered result generated from the brokered payload by the selected at least one trusted execution platform is received. A workload result based on the brokered result is returned to the source computing platform.

18 Claims, 6 Drawing Sheets

TRUSTED EXECUTION BROKER

BACKGROUND

Computer security threats continue to grow in volume and sophistication, particularly with the increase in lightly protected mobile computing devices. Trusted execution technologies can be used to counter these threats by defining safer and more isolated execution spaces within more secure computing environments. By offloading sensitive computational workloads to such safer computing environments, like secure datacenters, to execute workloads, users can rely on the network and physical security of such environments as a defense against such threats. However, implementation and management of trusted execution in such environments present considerable challenges including without limitation difficulties in scaling to large numbers of users, workloads, and computing environments; relatively static configuration options; heterogenous user requirements; heterogeneous computing environments; jurisdictional legal complexities, trusted I/O requirements; and/or a need for manual intervention. Existing trusted execution technologies fail to address such challenges.

SUMMARY

In at least one implementation, trusted execution of a workload payload is brokered among multiple trusted execution platforms. The workload payload is received from a source computing system and includes input data, trusted execution code, and one or more trusted execution policies. At least one of the multiple trusted execution platforms is selected based on the one or more trusted execution policies. A brokered payload is generated to include executable trusted execution code and the input data. The brokered payload is communicated to the selected at least one trusted execution platform. A brokered result generated from the brokered payload by the selected at least one trusted execution platform is received. A workload result based on the brokered result is returned to the source computing platform.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Modern computing exposes users to security threats relating to user data and computing operations. By employing trusted execution technologies, a user can securely communicate and execute workloads containing such operations in a trusted execution environment (TEE) on one or more trusted execution platforms. Trusted execution technology provides software and hardware platform components that promote improved security in computing. Elements of trusted execution technology can include without limitation one or more of the following: attestation of the authenticity of a hardware platform, its operating system, application code, and data; measurements of code and/or data; chains of trust; secure communications among trusted platforms; and trusted I/O.

A trusted execution broker can allocate or deploy such operations and associated data to one or more trusted execution platforms based on provided trusted execution policies to manage compilation and/or execution of trusted execution code on selected trusted execution platforms. Use of trusted execution policies, trusted compilation, and brokering of workloads to trusted execution platforms that satisfy the trusted execution policies allows for dynamic allocation of such workloads in an automated and scalable manner that can accommodate other execution constraints including without limitation heterogeneous computing environments (e.g., trusted execution platforms with different processor types, trusted execution platforms having different compilation requirements), changing user requirements, jurisdictional legal constraints (e.g., policies for trusted execution in limited jurisdictions), and I/O requirements.

Figure 1:
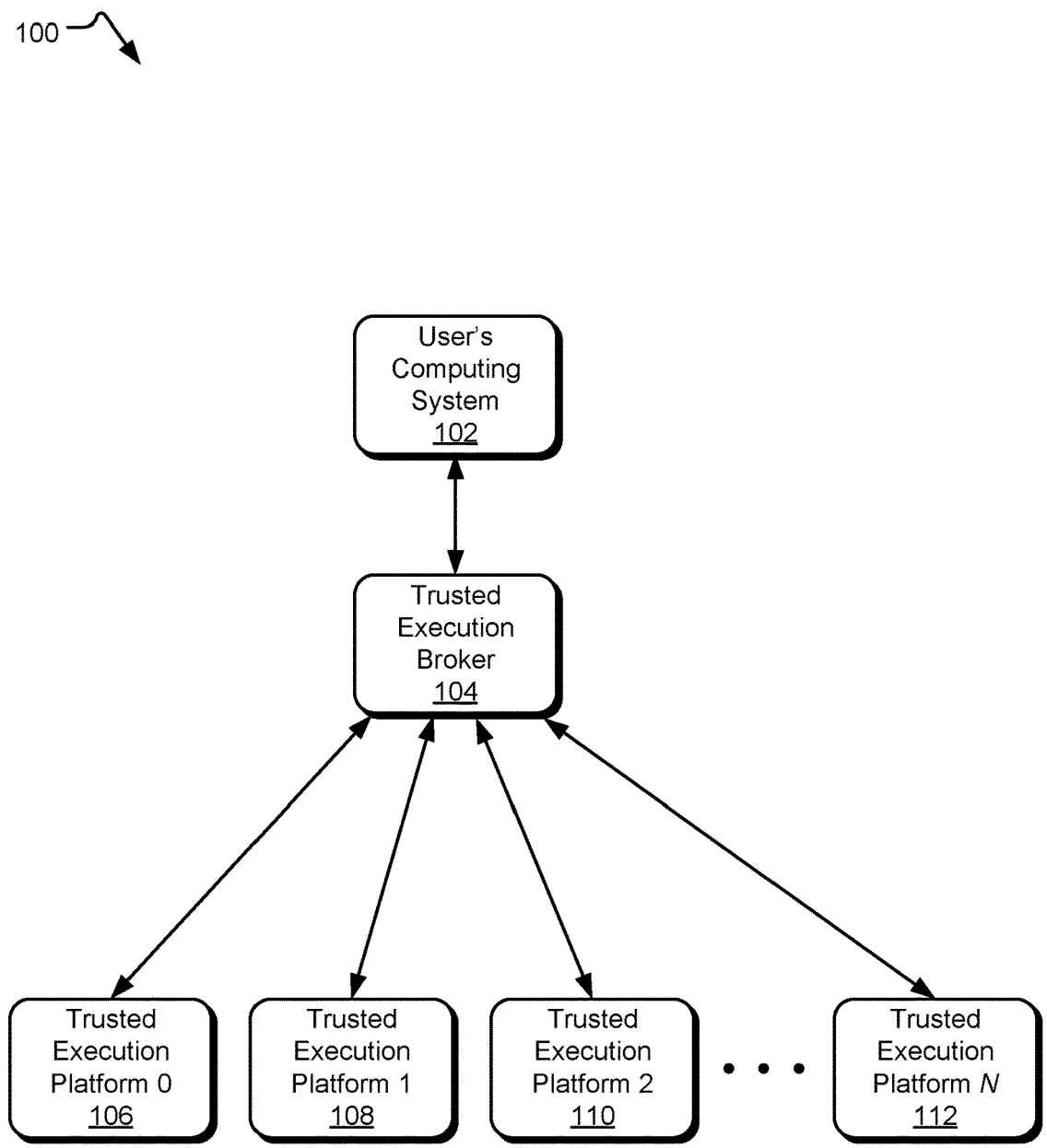
FIG. 1 illustrates an example brokered trusted execution environment.

FIG. 1 illustrates an example brokered trusted execution environment 100. A source computing system (e.g., a user's computing system 102) has one or more executable workloads allocated for trusted execution. For example, a doctor's desktop computer stores or has access to a patient's MRI (magnetic resonance imaging) data, and the doctor wishes to have the raw MRI data processed using adaptive scanning by one or more trusted execution supercomputers to identify regions of interest that may accelerate the discovery of pathologies. Trusted execution technologies can be used to maintain the security of the adaptive scanning workloads, including the MRI data and the adaptive scanning code itself (whether in the form of source code, executable code or some other format of programming code). Each adaptive scanning workload can include a single operation (e.g., perform a calculation operation on the provided input data and return the result) or multiple operations (e.g., perform multiple calculation operations on the provided input data and return the results). With a multi-operation workload, each operation of the workload may be available for execution on different trusted execution platforms. For example, a workload may specify that the same adaptive scanning can be performed on different frames of the MRI data in multiple adaptive scanning operations for different frames or frame ranges, so that that the multiple adaptive scanning operations can be performed on different trusted execution platforms. Alternatively, the user's computing system 102 may break up the operations of a potential multi-operation workload into separate single or multi-operation workloads.

Furthermore, using a trusted execution broker 104, the execution of the adaptive scanning workload operations can be allocated by the trusted execution broker 104 according to one or more trusted execution policies set forth by the doctor and/or his/her medical practice. In this manner, the trusted execution broker 104 receives the adaptive scanning workloads, including the one or more trusted execution policies, and allocates the adaptive scanning workloads to trusted execution platforms (e.g., one or more of trusted execution platforms 0-N, illustrated as trusted execution platforms 106, 108, 110, and 112) that can satisfy those policies. The trusted execution platforms to which the adaptive scanning workload operations have been allocated return the results of the trusted execution operations to the trusted execution broker 104, which returns them to the user's computing system 102. Alternatively, the trusted execution platforms can return the results directly to the user's computing system 102.

In one implementation, each of the trusted execution platforms that receives a brokered payload (e.g., including input data and an executable operation) derives an identity of the input data on that particular hardware platform and an identity of the executable code on that particular hardware platform. For example, the executable code in the brokered workload payload can be accompanied by an attestable record (e.g., an X.509 certificate issued by a certificate authority) and can be encrypted in accordance with a key pair. In this manner, the measurement of the executable code can be verified against the attestable record to confirm that the executable code can be trusted. Similar identity attestation may be applied to the input data to confirm that the input data used in the execution of the trusted executable code can be trusted and to any output data to confirm that the output data generated from the execution of the trusted executable code can also be trusted.

Figure 2:
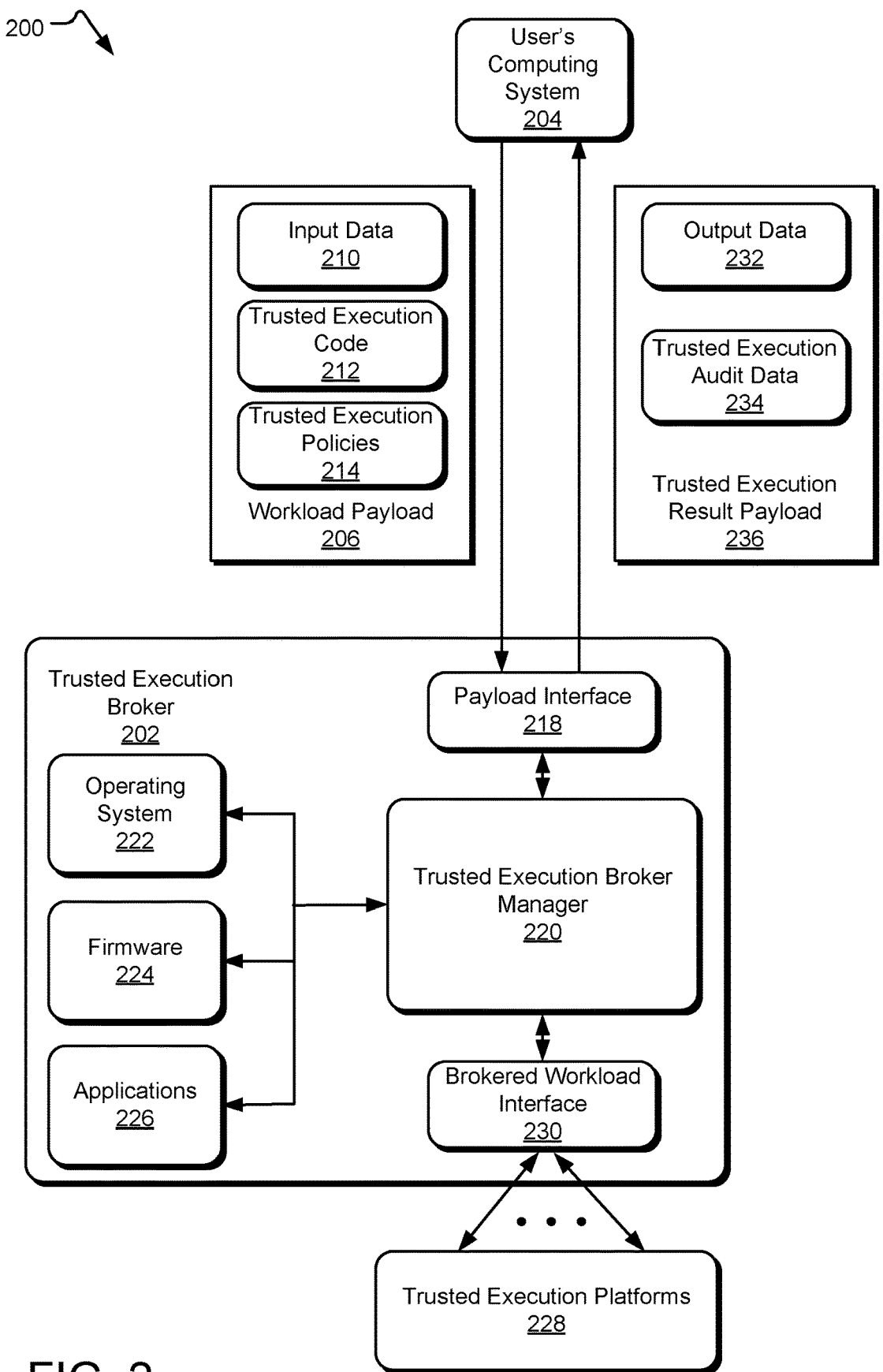
FIG. 2 illustrates an example brokered trusted execution environment with details of an example trusted execution broker.

FIG. 2 illustrates an example brokered trusted execution environment 200 with details of an example trusted execution broker 202. A source computing system (e.g., a user's computing system 204) transmits a workload payload 206 (e.g., specifying either a single operation or multiple operations) to a trusted execution broker 202. In one implementation, the workload payload 206 contains input data 210, trusted execution code 212, and one or more trusted execution policies 214, although other payload formats may be employed. The trusted execution broker 202 may be executed in many different configurations, including without limitation in the cloud, on a workstation or server, on an IoT device, on a mobile device, and on an edge device.

Various levels and combinations of encryption and identity attestation may be employed for the workload payload 206 and its components. In one implementation, the workload payload 206 itself may be encrypted using a key pair that allows the trusted execution broker 202 to decrypt the workload payload 206. Likewise, the workload payload 206 may be signed using an attestation record that the trusted execution broker 202 can use to derive the identity of the workload payload 206 (e.g., validating the workload payload 206 by verifying its purported identity).

Furthermore, individual components of the workload payload 206 may be encrypted and/or signed for the same or different targets. For example, the one or more trusted execution policies 214 of the workload payload 206 may be encrypted and signed for the trusted execution broker 202 to decrypt and verify its purported identity. Alternatively, the one or more trusted execution policies 214 may be encrypted and signed for a separate trusted execution platform to decrypt and verify its purported identity. In this alternative, the separate trusted execution platform can play the role of a trusted policy manager platform and return a policy evaluation decision, which the trusted execution broker 202 evaluates to allocate the trusted execution of the trusted execution code 212 on the input code 210 to a target trusted execution platform or category of trusted execution platforms.

In another example, the trusted execution code 212 of the workload payload 206 may be encrypted and signed for the trusted execution broker 202 to decrypt and verify is purported identity and thereafter compile for one or more target trusted execution platforms. Alternatively, the trusted execution code 212 may be encrypted and signed for a separate trusted execution platform (playing the role of a trusted compiler platform) to decrypt and verify its purported identity. In this alternative, the separate trusted execution platform can play the role of a trusted compiler platform and return an executable code result for a target trusted execution platform or category of trusted execution platforms.

In yet another example, the input data 210 is encrypted and signed for a separate trusted execution platform to decrypt and verify its purported identity. In this alternative, the separate trusted execution platform can execute the trusted execution code 212 on the input data 210, without any other platform accessing the decrypted input data. and return an execution result from the target trusted execution platform. In an alternative, albeit less common, implementation, the input data 210 of the workload payload 206 may be encrypted and signed for the trusted execution broker 202 to decrypt and verify its purported identity before allocating the input data in a brokered payload to one or more target trusted execution platforms (e.g., perhaps allowing the trusted execution broker 202 to divide the input data 210 for distribution among different trusted execution platforms).

As shown in FIG. 2, the trusted execution broker 202 receives the workload payload 206 via a payload interface 218, which directs the workload payload 206 (and potentially other workload payloads) to a trusted execution broker manager 220. The trusted execution broker manager 220 may be communicatively coupled to an operating system 222, firmware 224, and/or applications 226 of the trusted execution broker 202. The trusted execution broker manager 220 may also access internal configuration policies for handling workload payloads (e.g., whether to internally compile the code or to offload the code to a separate platform for compilation), including an index or mapping of registered trusted execution platforms and their associated configurations and/or abilities. The trusted execution broker manager 220 allocates one or more brokered workloads (e.g., the workload payload 206) to one or more trusted execution platforms 228 via a brokered workload interface 230. The one or more trusted execution platforms 228 perform their trusted execution operations on the one or more brokered workloads and return one or more brokered results to the trusted execution broker manager 220 via the brokered workload interface 230. The brokered results may also include trust data pertaining to the trusted execution on the one or more trusted execution platforms 228.

To allow the multiple trusted execution platforms 228 to communicate in a trusted manner with each other and with the trusted execution broker 202, trust is established via platform attestation of the hardware and software (e.g., the operating system) of the trusted execution platforms themselves. If the identity of a trusted execution platform (and/or the trusted execution broker) is validated (e.g., based on the trusted execution broker's certificate authority), then the trusted execution platform (and/or the trusted execution broker) can establish symmetric channel encryption keys with a Secret Agreement (e.g., Diffie-Hellman). The certificate from the broker's certificate authority may be used by any computing system located outside the zone of trust to verify trust of any platform within the zone of trust. In this manner, the computing system located outside the zone of trust can interact with trust with any platform located within the zone or trust (e.g., to send encrypted/signed policies to the trusted execution platform and consume computed results encrypted/signed by the trusted execution platform).

Depending on the internal policies, the trusted execution broker manager 220 may spawn new trusted executions on the trusted execution platforms 228 based on the returned results or transmit the returned results as a trusted execution result payload 236 to the user's computing system 204. The trusted execution result payload 236 includes output data 232 from the one or more brokered results generated by the one or more trusted execution platforms 228. The trusted execution results payload 236 may also include, in trusted execution audit data 234, some or all of the trust data pertaining to the trusted execution on the one or more trusted execution platforms 228. The user's computing system 204 can evaluate the trusted execution audit data 234 to ultimately decide whether to trust the output data 232.

Implementations of the brokered trusted execution environment 200 may vary. In one implementation, the trusted execution broker 104 may be part of a trusted execution platform. For example, the trusted execution broker may execute in a trusted execution environment (TEE) in a trusted computing platform that can decrypt the trusted execution code 212, which in this example is in the form of source code, and execute a compiler (in a TEE) on the trusted execution code 212 to generate machine executable code targeted for a particular trusted execution platform (e.g., the source code is compiled for execution on an Intel-based trusted execution platform, rather than an ARM-based trusted execution platform). In such an implementation, by executing the trusted execution broker 202 in a TEE, the compiled execution code can be trusted.

However, in other implementations, the trusted execution broker 202 need not be executed as part of a trusted execution platform. For example, the trusted execution code 212 of the workload payload 206 may already be compiled. As such, the trusted execution broker 202 can access the one or more trusted execution policies 214 of the workload payload 206 to evaluate which trusted execution platforms satisfy these policies, but the trusted execution broker 202 need not perform a trusted execution operation (e.g., to compile any source code in the workload payload 206). In another example (e.g., as previously discussed; see also the description of FIG. 4 herein), the trusted execution broker 202 can offload the compilation of any source code in the workload payload 206 to a trusted execution platform capable of executing a compiler for one or more targeted trusted execution platforms. In yet another example (e.g., as previously discussed; see also the description of FIG. 4 herein), the trusted execution broker 202 can offload the access and/or evaluation of the one or more trusted execution policies 214 in the workload payload 206 to a trusted execution platform.

As shown by at least the foregoing examples, the trusted execution broker 202 may offload trusted execution tasks or otherwise avoid the need for trusted execution. Accordingly, in at least these examples, the trusted execution broker 202 need not be part of a trusted execution platform.

Figure 3:
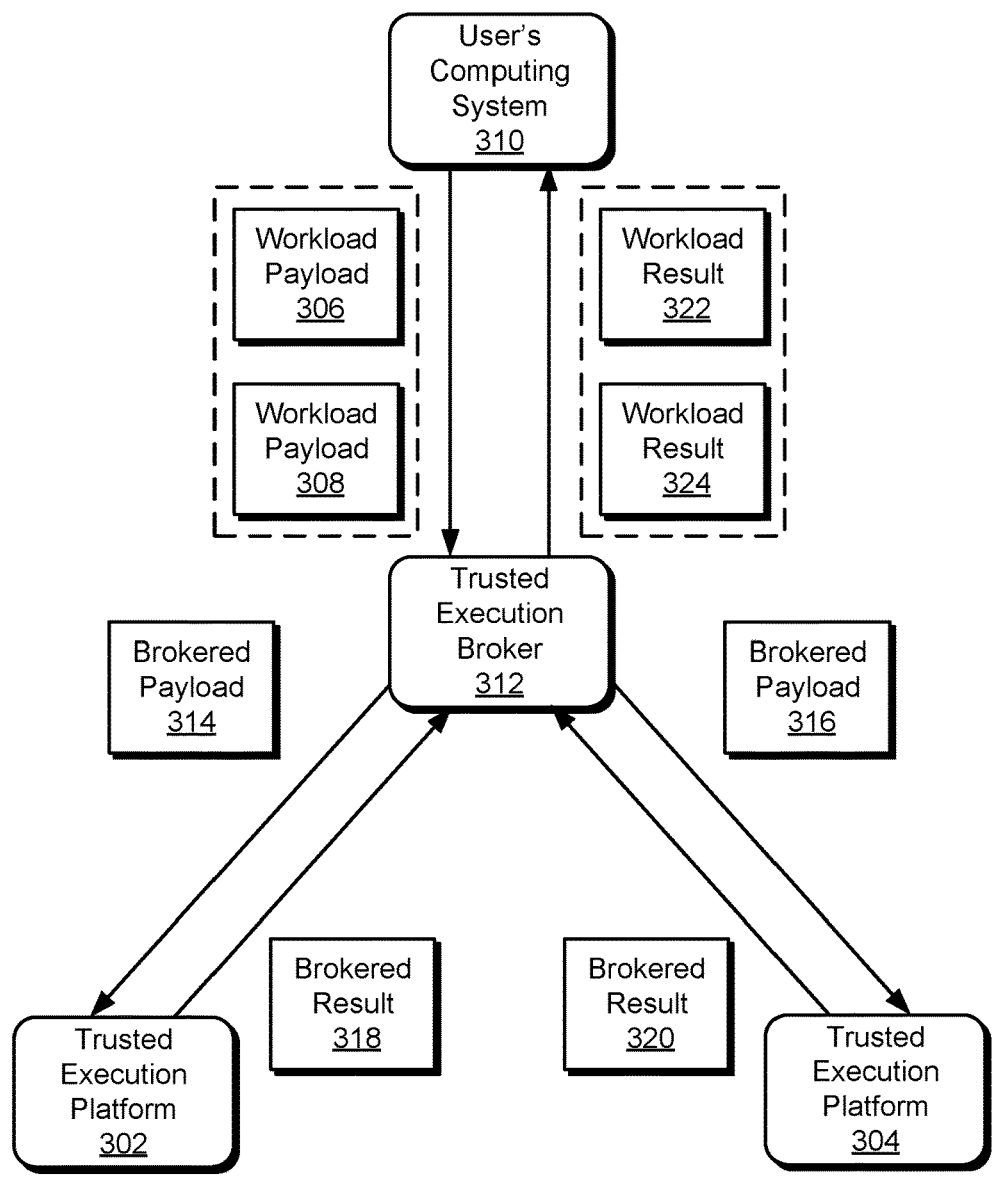
FIG. 3 illustrates an example brokered trusted execution environment supporting multiple trusted execution platforms for multiple workloads.

FIG. 3 illustrates an example brokered trusted execution environment 300 supporting multiple trusted execution platforms (e.g., trusted execution platforms 302 and 304) for multiple workloads (e.g., workload payloads 306 and 308). A source computing system (e.g., a user's computing system 310) transmits the workload payloads 306 and 308 to a trusted execution broker 312. The trusted execution broker 312, internally or via an offloaded operation to a separate trusted execution platform, evaluates the one or more trusted execution policies of the workload payloads 306 and 308 and allocates the trusted execution code and input data of each payload as brokered payloads 314 and 316 to the trusted execution platforms 302 and 304, respectively, according to one or more trusted execution policies. For example, the one or more trusted execution policies may require that a particular workload payload is executed in the United States on an Intel-based trusted execution platform. As such, the trusted execution broker 312 transmits the corresponding brokered payload to a trusted execution platform satisfying those requirements. Another example trusted execution policy may identify a requirement that the trusted execution platform to execute the trusted execution code of a particular workload payload must have the ability to control an identified control system (e.g., a valve, a trigger, a power supply) via trusted I/O (input/output). The trusted execution broker 312 allocates such workloads for execution on the selected trusted execution platforms.

The trusted execution platforms 302 and 304 return the results of their trusted execution operations as brokered results 318 and 320, respectively. The trusted execution broker 312 returns corresponding workload results 322 and 324 to the user's computing system 310.

Figure 4:
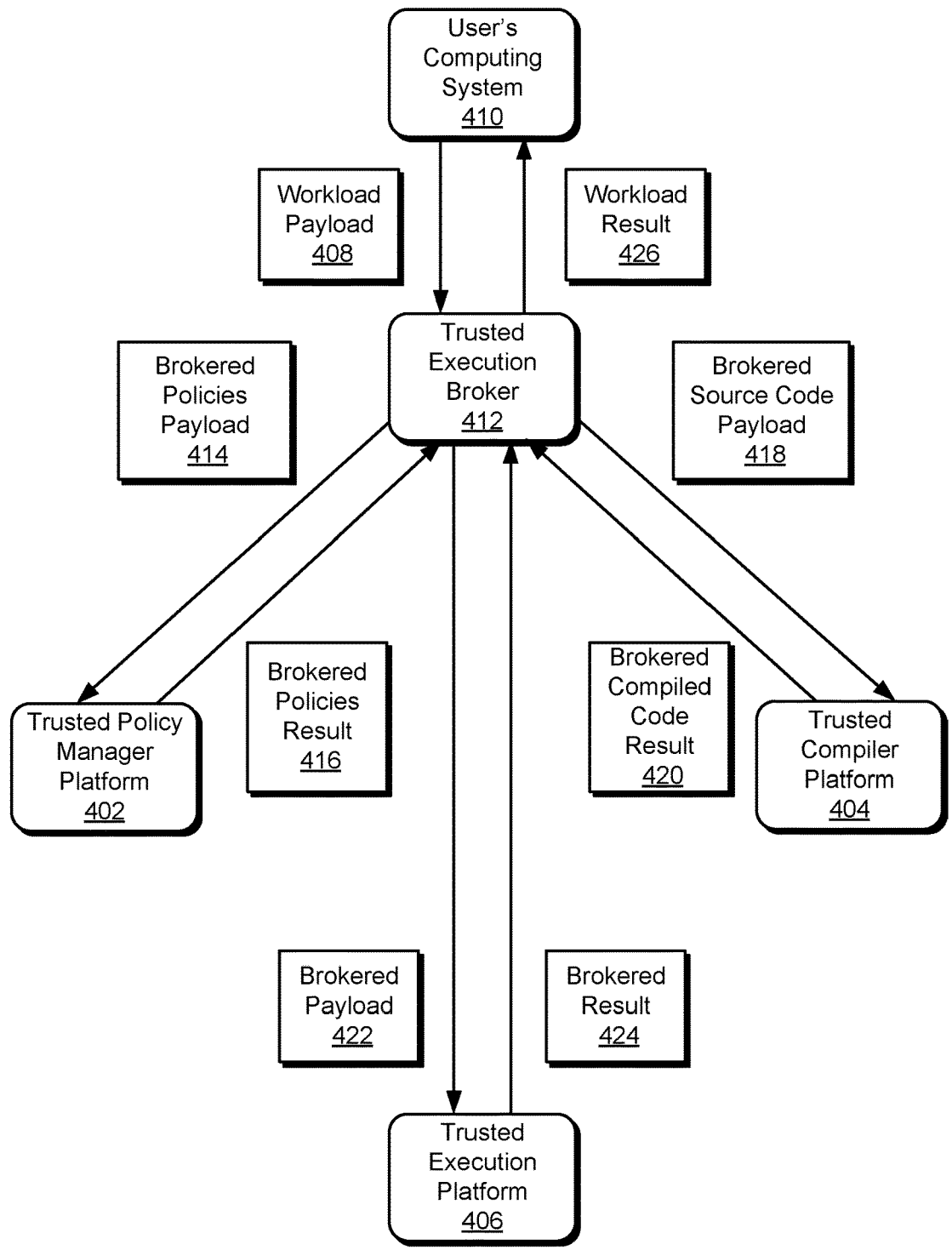
FIG. 4 illustrates an example brokered trusted execution environment supporting a trusted policy manager platform, a trusted compiler platform, and a trusted execution platform for executing a workload.

FIG. 4 illustrates an example brokered trusted execution environment 400 supporting a trusted policy manager platform 402, a trusted compiler platform 404, and a trusted execution platform 406 for executing a workload payload 408. A source computing system (e.g., a user's computing system 410) transmits the workload payload 408 to a trusted execution broker 412. The trusted execution broker 412 offloads evaluation of the one or more trusted execution policies of the workload payload 408 as a brokered policies payload 414 to a trusted execution platform performing the role of the trusted policy manager platform 402. The trusted policy manager platform 402 evaluates the one or more trusted execution policies of the workload payload 408 (as they exist in the brokered policies payload 414), determines which registered trusted execution platforms satisfy the one or more trusted execution policies, and returns a policy evaluation decision in a brokered policies result 416 to the trusted execution broker 412. For example, the one or more trusted execution policies may require that the workload payload 408 be executed in the United States on an Intel-based trusted execution platform. As such, the brokered policies result 416 may include allocation instructions in the brokered policies result 416 that instruct the trusted execution broker 412 to transmit a corresponding brokered payload to the trusted execution platform 406, which satisfies those policy requirements. In the scenario illustrated in FIG. 4, transmission of a brokered payload 422 to the trusted execution platform 406 is also dependent upon offloaded compilation of source code provided in the workload payload 408; however, different interdependencies may be employed in different brokered trusted execution scenarios.

In FIG. 4, the trusted execution broker 412 also offloads compilation of the trusted execution code of the workload payload 408 as a brokered source code payload 418 to a trusted execution platform performing the role of the trusted compiler platform 404. The trusted compiler platform 404 compiles the source code provided in the workload payload 408 (as they exist in the brokered source code payload 418) and returns executable code in a brokered compiled code result 420 to the trusted execution broker 412. It should be understood that multiple versions of compiled code may be returned in the brokered compiled code result 420 (e.g., if the one or more trusted execution policies of the workload payload 408 allow for allocation of the workload payload 408 to different classifications of trusted execution platforms (e.g., Intel-based, ARM-based).

Based on the policy evaluation decision received in the brokered policies result 416, the trusted execution broker 412 allocates (e.g., including a communication operation) the trusted execution code (in executable code format) and input data of the workload payload 408 as a brokered payload 422 to the trusted execution platform 406.

The trusted execution platform 406 returns the results of its trusted execution operation as a brokered result 424. The trusted execution broker 412 returns a corresponding workload result 426 to the user's computing system 410.

Figure 5:
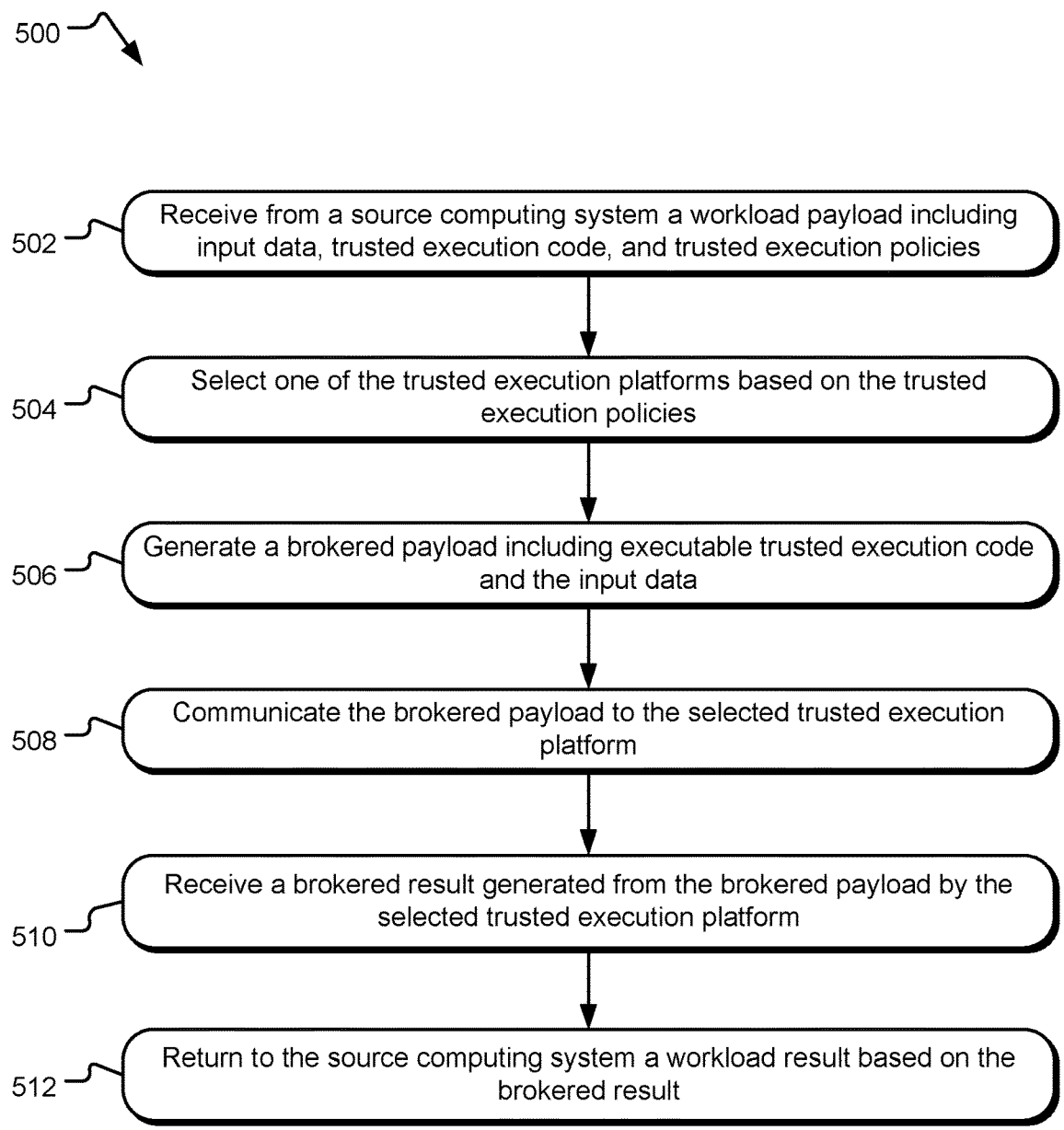
FIG. 5 illustrates example operations for brokering trusted execution of a workload.

FIG. 5 illustrates example operations 500 for brokering trusted execution of a workload. A receiving operation 502 receives from a source computing system a workload payload including input data, trusted execution code, and one or more trusted execution policies. A selecting operation 504 selects one of the trusted execution platforms based on the one or more trusted execution policies. A generating operation 506 generates a brokered payload including executable trusted execution code and the input data. A communicating operation 508 communicates the brokered payload to the selected trusted execution platform. Another receiving operation 510 receives a brokered result generated from the brokered payload by the selected trusted execution platform. A returning operation 512 returns a workload result based on the brokered result to the source computing system.

Figure 6:
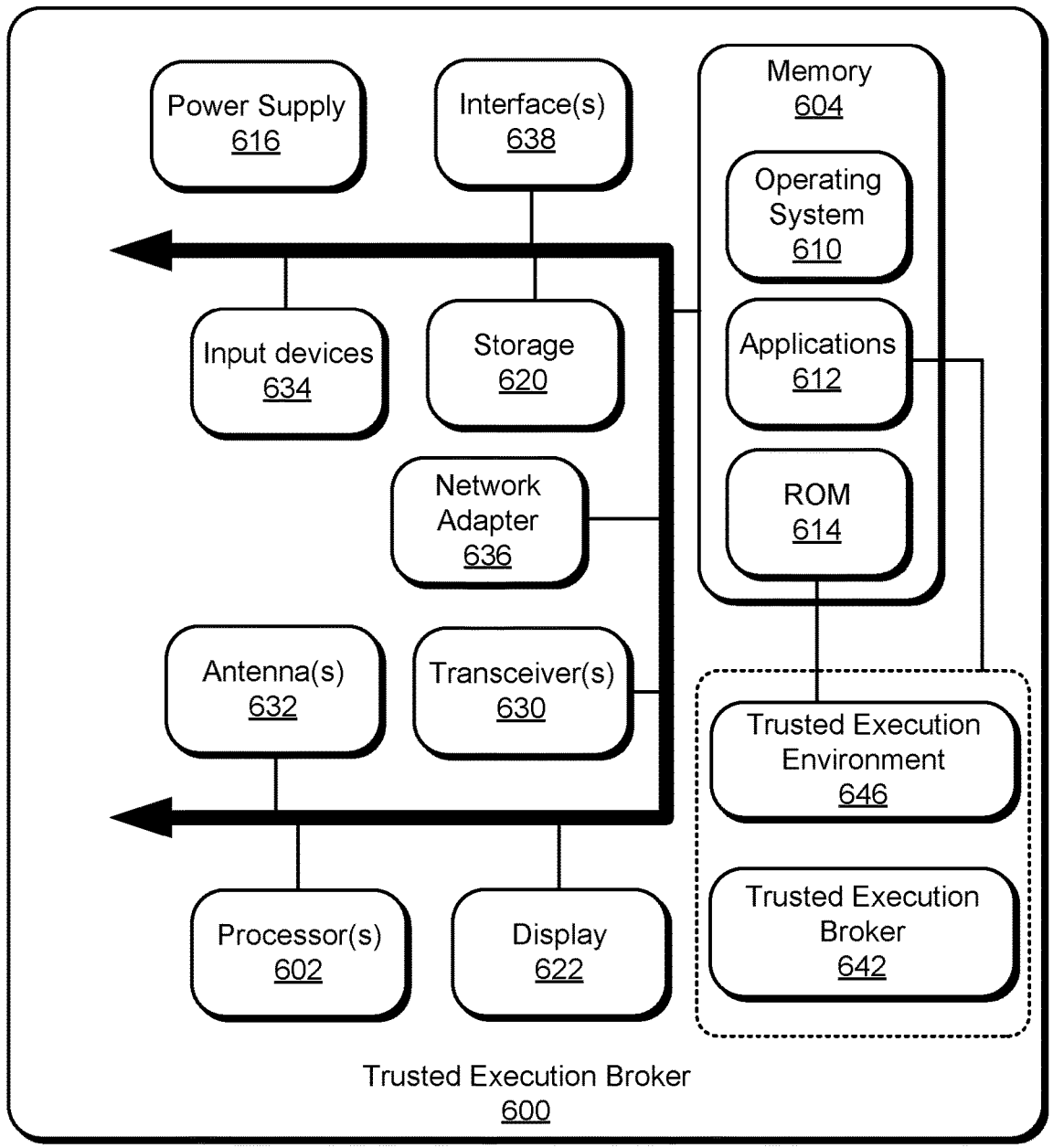
FIG. 6 illustrates an example system that may be useful in implementing the described technology.

FIG. 6 illustrates an example system (labeled as a processing system 600) that may be useful in implementing the described technology. The processing system 600 may be a client device, such as a laptop, mobile device, desktop, tablet, or a server/cloud device. The processing system 600 includes one or more processor(s) 602, circuits, and a memory 604. The memory 604 generally includes both volatile memory (e.g., RAM) and non-volatile memory (e.g., flash memory). An operating system 610 resides in the memory 604 and is executed by the processor 602. The memory 604 includes a read-only memory (ROM) 614, which may be a write once, read many (WORM) memory.

A trusted execution broker 642, one or more application 612 modules or segments and/or a trusted execution environment 646 are at least partially loaded in the memory 604 and/or storage 620 and executed by the processor 602. The trusted execution broker 642 may be executed in a TEE, using a TEE, or as part of a TEE, although the trusted execution broker 642 need not provide trusted execution itself. Firmware, a payload interface, and a brokered workload interface manager may also be loaded in the memory 604 and executed by the processor 602. The trusted execution environment 646 may be at least partially stored in the ROM 614 (or WORM) and executed by the processor 602. Data, such as user input and output data, source code, measurements, keys, passwords, root secrets, etc. may be stored in the memory 604 or storage 620 and may be retrievable by the processor 602 for use in the by the trusted execution broker 642. The storage 620 may be local to the processing system 600 or may be remote and communicatively connected to the processing system 600 and may include another server.

The processing system 600 includes a power supply 616, which is powered by one or more batteries or other power sources and which provides power to other components of the processing system 600. The power supply 616 may also be connected to an external power source that overrides or recharges the built-in batteries or other power sources.

The processing system 600 may include one or more communication transceivers 630 which may be connected to one or more antenna(s) 632 to provide network connectivity (e.g., mobile phone network, Wi-Fi®, Bluetooth®, etc.) to one or more other servers and/or client devices (e.g., mobile devices, desktop computers, or laptop computers). The processing system 600 may further include a network adapter 636, which is a type of communication device. The processing system 600 may use the network adapter 636 and any other types of communication devices for establishing connections over a wide-area network (WAN) or local-area network (LAN). It should be appreciated that the network connections shown are exemplary and that other communications devices and means for establishing a communications link between the processing system 600 and other devices may be used.

The processing system 600 may include one or more input devices 634 such that a user may enter commands and information (e.g., a keyboard or mouse). These and other input devices may be coupled to the server by one or more interfaces 638, such as a serial port interface, parallel port, universal serial bus (USB), etc. The processing system 600 may further include a display 622, such as a touchscreen display.

The processing system 600 may include a variety of tangible processor-readable storage media and intangible processor-readable communication signals. Tangible processor-readable storage can be embodied by any available media that can be accessed by the processing system 600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information, such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 600. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media, such as a wired network or direct-wired connection, and wireless media, such as acoustic, RF, infrared, and other wireless media.

An example method of brokering trusted execution of a workload payload among multiple trusted execution platforms is provided. The multiple trusted execution platforms include heterogeneous trusted execution platforms having different compilation requirements. The workload payload includes input data, trusted execution code, and one or more trusted execution policies. The example method includes selecting at least one of the multiple trusted execution platforms based on the one or more trusted execution policies of the workload payload received from a source computing system, generating a brokered payload including executable trusted execution code and the input data, and returning, to the source computing platform, a workload result based on a brokered result generated from the brokered payload by the selected at least one of the multiple trusted execution platforms.

Another example method of any preceding method is provided wherein the trusted execution code of the workload payload is associated with an attestation record. The trusted execution code is decrypted by the selected at least one of the multiple trusted execution platforms, and the trusted execution code is validated by the selected at least one of the multiple trusted execution platforms using the attestation record.

Another example method of any preceding method is provided wherein the input data of the workload payload is associated with an attestation record. The input data is decrypted by the selected at least one of the multiple trusted execution platforms, and the input data is validated by the selected at least one of the multiple trusted execution platforms using the attestation record.

Another example method of any preceding method is provided wherein the selecting operation includes evaluating the one or more trusted execution policies against the trusted execution platforms to identify one or more of the multiple trusted execution platforms satisfying the one or more trusted execution policies. The one or more of the multiple trusted execution platforms includes the selected at least one of the multiple trusted execution platforms.

Another example method of any preceding method is provided wherein a trusted execution broker executes the selecting operation. The one or more trusted execution policies of the workload payload are associated with an attestation record. The evaluating operation includes decrypting the one or more trusted execution policies by the trusted execution broker and validating the one or more trusted execution policies by the trusted execution broker using the attestation record.

Another example method of any preceding method is provided wherein the selecting operation includes communicating the one or more trusted execution policies to one of the trusted execution platforms designated as a trusted policy manager platform for evaluation of the one or more trusted execution policies by the trusted policy manager platform and receiving allocation instructions generated by the trusted policy manager platform. The allocation instructions identify the at least one of the trusted execution platforms selected in the selecting operation.

Another example method of any preceding method is provided wherein the one or more trusted execution policies of the workload payload are associated with an attestation record. The one or more trusted execution policies are decrypted by the trusted policy manager platform and are validated by the trusted policy manager platform using the attestation record.

Another example method of any preceding method is provided wherein the generating operation includes compiling the trusted execution code for execution by the selected at least one of the multiple trusted execution platforms.

Another example method of any preceding method is provided wherein a trusted execution broker executes the generating operation. The trusted execution code of the workload payload is associated with an attestation record. The generating operation includes decrypting the trusted execution code by the trusted execution broker and validating the trusted execution code by the trusted execution broker using the attestation record.

Another example method of any preceding method is provided wherein the generating operation includes identifying, based on the one or more trusted execution policies, one of the trusted execution platforms as a trusted compiler platform to compile the trusted execution code. The generating operation also includes communicating the trusted execution code to the trusted compiler platform for compilation by the trusted compiler platform and receiving executable code compiled by the trusted compiler platform for communication to and execution by the selected at least one of the multiple trusted execution platforms.

Another example method of any preceding method is provided wherein the trusted execution code of the workload payload is associated with an attestation record. The trusted execution code is decrypted by the trusted compiler platform and is validated by the trusted compiler platform using the attestation record.

An example system for brokering trusted execution of a workload payload among multiple trusted execution platforms is provided including one or more processors and a payload interface executed by the one or more processors and configured to receive, from a source computing system, the workload payload. The payload interface is further configured to return, to the source computing platform, a workload result based on a brokered result, the workload payload including input data, trusted execution code, and one or more trusted execution policies. The example system also includes a trusted execution broker manager communicatively coupled to the payload interface and executed by the one or more processors. The trusted execution broker manager is configured to select at least one of the multiple trusted execution platforms based on the one or more trusted execution policies of the workload payload received from the source computing system and to generate a brokered payload including executable trusted execution code and the input data. A brokered workload interface is communicatively coupled to the trusted execution broker manager and is executed by the one or more processors. The brokered workload interface is configured to communicate the brokered payload to the selected at least one of the multiple trusted execution platforms and to receive a brokered result generated from the brokered payload by the selected at least one of the multiple trusted execution platforms.

Another example system of any preceding system is provided wherein the trusted execution broker manager is further configured to evaluate the one or more trusted execution policies against the trusted execution platforms to identify one or more of the multiple trusted execution platforms satisfying the one or more trusted execution policies, the one or more of the multiple trusted execution platforms including the selected at least one of the multiple trusted execution platforms.

Another example system of any preceding system is provided wherein the trusted execution broker manager is further configured to compile the trusted execution code for execution by the selected at least one of the multiple trusted execution platforms according to the one or more trusted execution policies.

One or more tangible processor-readable storage media is embodied with instructions for executing on one or more processors and circuits of a device a process of brokering trusted execution of a workload payload among multiple trusted execution platforms. A workload payload is received from a source computing system. The workload payload includes input data, trusted execution code, and one or more trusted execution policies. At least one of the multiple trusted execution platforms is selected based on the one or more trusted execution policies of the workload payload received from the source computing system. A brokered payload including executable trusted execution code and the input data is generated. The brokered payload is communicated to the selected at least one of the multiple trusted execution platforms. A brokered result generated from the brokered payload by the selected at least one of the multiple trusted execution platforms is received. A workload result based on the brokered result is returned to the source computing platform.

One or more tangible processor-readable storage media of any preceding claim provide another example process wherein the selecting operation includes evaluating the one or more trusted execution policies against the trusted execution platforms to identify one or more of the multiple trusted execution platforms satisfying the one or more trusted execution policies, the one or more of the multiple trusted execution platforms including the selected at least one of the multiple trusted execution platforms.

One or more tangible processor-readable storage media of any preceding claim provide another example process wherein the selecting operation includes communicating the one or more trusted execution policies to one of the trusted execution platforms designated as a trusted policy manager platform for evaluation of the one or more trusted execution policies by the trusted policy manager platform and receiving allocation instructions generated by the trusted policy manager platform, the allocation instructions identifying the selected at least one of the multiple trusted execution platforms selected in the selecting operation.

One or more tangible processor-readable storage media of any preceding claim provide another example process wherein the generating operation includes compiling the trusted execution code for execution by the selected at least one of the multiple trusted execution platforms.

One or more tangible processor-readable storage media of any preceding claim provide another example process wherein the generating operation includes selecting, based on the one or more trusted execution policies, one of the trusted execution platforms as a trusted compiler platform to compile the trusted execution code, communicating the trusted execution code to the trusted compiler platform for compilation by the trusted compiler platform, and receiving executable code compiled by the trusted compiler platform for communication to and execution by the selected at least one of the multiple trusted execution platforms.

One or more tangible processor-readable storage media of any preceding claim provide another example process wherein the trusted execution code of the workload payload is associated with an attestation record. The trusted execution code is decrypted by the trusted compiler platform and is validated by the trusted compiler platform using the attestation record.

An example system for brokering trusted execution of a workload payload among multiple trusted execution platforms is provided. The multiple trusted execution platforms include heterogeneous trusted execution platforms having different compilation requirements. The workload payload includes input data, trusted execution code, and one or more trusted execution policies. The example system includes means for selecting at least one of the multiple trusted execution platforms based on the one or more trusted execution policies of the workload payload received from a source computing system, means for generating a brokered payload including executable trusted execution code and the input data, and means for returning, to the source computing platform, a workload result based on a brokered result generated from the brokered payload by the selected at least one of the multiple trusted execution platforms.

Another example system of any preceding system is provided wherein the trusted execution code of the workload payload is associated with an attestation record. The trusted execution code is decrypted by the selected at least one of the multiple trusted execution platforms, and the trusted execution code is validated by the selected at least one of the multiple trusted execution platforms using the attestation record.

Another example system of any preceding system is provided wherein the input data of the workload payload is associated with an attestation record. The input data is decrypted by the selected at least one of the multiple trusted execution platforms, and the input data is validated by the selected at least one of the multiple trusted execution platforms using the attestation record.

Another example system of any preceding system is provided wherein the means for selecting includes means for evaluating the one or more trusted execution policies against the trusted execution platforms to identify one or more of the multiple trusted execution platforms satisfying the one or more trusted execution policies. The one or more of the multiple trusted execution platforms includes the selected at least one of the multiple trusted execution platforms.

Another example system of any preceding system is provided wherein a trusted execution broker executes the means for selecting. The one or more trusted execution policies of the workload payload are associated with an attestation record. The means for evaluating includes means for decrypting the one or more trusted execution policies by the trusted execution broker and means for validating the one or more trusted execution policies by the trusted execution broker using the attestation record.

Another example system of any preceding system is provided wherein the means for selecting includes means for communicating the one or more trusted execution policies to one of the trusted execution platforms designated as a trusted policy manager platform for evaluation of the one or more trusted execution policies by the trusted policy manager platform and means for receiving allocation instructions generated by the trusted policy manager platform. The allocation instructions identify the at least one of the trusted execution platforms selected by the means for selecting.

Another example system of any preceding system is provided wherein the one or more trusted execution policies of the workload payload are associated with an attestation record. The one or more trusted execution policies are decrypted by the trusted policy manager platform and are validated by the trusted policy manager platform using the attestation record.

Another example system of any preceding system is provided wherein the means for generating includes means for compiling the trusted execution code for execution by the selected at least one of the multiple trusted execution platforms.

Another example system of any preceding system is provided wherein a trusted execution broker executes the means for generating. The trusted execution code of the workload payload is associated with an attestation record. The means for generating includes means for decrypting the trusted execution code by the trusted execution broker and means for validating the trusted execution code by the trusted execution broker using the attestation record.

Another example system of any preceding system is provided wherein the means for generating includes means for identifying, based on the one or more trusted execution policies, one of the trusted execution platforms as a trusted compiler platform to compile the trusted execution code. The means for generating also includes means for communicating the trusted execution code to the trusted compiler platform for compilation by the trusted compiler platform and receiving executable code compiled by the trusted compiler platform for communication to and execution by the selected at least one of the multiple trusted execution platforms.

Another example system of any preceding system is provided wherein the trusted execution code of the workload payload is associated with an attestation record. The trusted execution code is decrypted by the trusted compiler platform and is validated by the trusted compiler platform using the attestation record.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of brokering trusted execution of a workload payload among multiple trusted execution platforms, the multiple trusted execution platforms including heterogeneous trusted execution platforms having different compilation requirements, the workload payload including input data, trusted execution code, and one or more trusted execution policies, the method comprising:
    selecting, by a trusted execution broker, at least one of the multiple trusted execution platforms based on the one or more trusted execution policies of the workload payload received from a source computing system, wherein the one or more trusted execution policies of the workload payload are associated with an attestation record, the selecting operation including evaluating the one or more trusted execution policies against the trusted execution platforms to identify one or more of the multiple trusted execution platforms satisfying the one or more trusted execution policies, the evaluating operation including decrypting the one or more trusted execution policies by the trusted execution broker and validating the one or more trusted execution policies by the trusted execution broker using the attestation record;
    generating a brokered payload including executable trusted execution code and the input data; and
    returning, to the source computing platform, a workload result based on a brokered result generated from the brokered payload by the selected at least one of the multiple trusted execution platforms.

2. The method of claim 1 wherein the trusted execution code of the workload payload is associated with the attestation record, and the trusted execution code is decrypted by the selected at least one of the multiple trusted execution platforms and is validated by the selected at least one of the multiple trusted execution platforms using the attestation record.

3. The method of claim 1 wherein the input data of the workload payload is associated with the attestation record, and the input data is decrypted by the selected at least one of the multiple trusted execution platforms and is validated by the selected at least one of the multiple trusted execution platforms using the attestation record.

4. The method of claim 1 wherein the one or more of the multiple trusted execution platforms includes the selected at least one of the multiple trusted execution platforms.

5. The method of claim 1 wherein the selecting operation comprises:
    communicating the one or more trusted execution policies to one of the trusted execution platforms designated as a trusted policy manager platform for evaluation of the one or more trusted execution policies by the trusted policy manager platform; and
    receiving allocation instructions generated by the trusted policy manager platform, the allocation instructions identifying the at least one of the trusted execution platforms selected in the selecting operation.

6. The method of claim 1 wherein the generating operation comprises:
    compiling the trusted execution code for execution by the selected at least one of the multiple trusted execution platforms.

7. The method of claim 6 wherein the trusted execution broker executes the generating operation, the trusted execution code of the workload payload is associated with the attestation record, and the generating operation comprises:
    decrypting the trusted execution code by the trusted execution broker; and validating the trusted execution code by the trusted execution broker using the attestation record.

8. The method of claim 1 wherein the generating operation comprises:
identifying, based on the one or more trusted execution policies, one of the trusted execution platforms as a trusted compiler platform to compile the trusted execution code;
communicating the trusted execution code to the trusted compiler platform for compilation by the trusted compiler platform; and
receiving executable code compiled by the trusted compiler platform for communication to and execution by the selected at least one of the multiple trusted execution platforms.

9. The method of claim 8 wherein the trusted execution code of the workload payload is associated with the attestation record, and the trusted execution code is decrypted by the trusted compiler platform and is validated by the trusted compiler platform using the attestation record.

10. A system for brokering trusted execution of a workload payload among multiple trusted execution platforms, the system comprising:
one or more processors;
a payload interface executed by the one or more processors and configured to receive, from a source computing system, the workload payload and to return, to the source computing platform, a workload result based on a brokered result, the workload payload including input data, trusted execution code, and one or more trusted execution policies;
a trusted execution broker manager communicatively coupled to the payload interface and executed by the one or more processors, the trusted execution broker manager being configured to select at least one of the multiple trusted execution platforms based on the one or more trusted execution policies of the workload payload received from the source computing system and to generate a brokered payload including executable trusted execution code and the input data, wherein the one or more trusted execution policies of the workload payload are associated with an attestation record and the at least one of the multiple trusted execution platforms are selected by evaluation of the one or more trusted execution policies against the trusted execution platforms to identify one or more of the multiple trusted execution platforms satisfying the one or more trusted execution policies, the evaluating including decryption of the one or more trusted execution policies by the trusted execution broker and validation of the one or more trusted execution policies by the trusted execution broker using the attestation record; and
a brokered workload interface communicatively coupled to the trusted execution broker manager and executed by the one or more processors, the brokered workload interface being configured to communicate the brokered payload to the selected at least one of the multiple trusted execution platforms and to receive the brokered result generated from the brokered payload by the selected at least one of the multiple trusted execution platforms.

11. The system of claim 10 wherein the one or more of the multiple trusted execution platforms including the selected at least one of the multiple trusted execution platforms.

12. The system of claim 10 wherein the trusted execution broker manager is further configured to compile the trusted execution code for execution by the selected at least one of the multiple trusted execution platforms according to the one or more trusted execution policies.

13. One or more tangible processor-readable storage media embodied with instructions for executing on one or more processors and circuits of a device a process of brokering trusted execution of a workload payload among multiple trusted execution platforms comprising:
receiving, from a source computing system, the workload payload, the workload payload including input data, trusted execution code, and one or more trusted execution policies;
selecting, by a trusted execution broker, at least one of the multiple trusted execution platforms based on the one or more trusted execution policies of the workload payload received from the source computing system, wherein the one or more trusted execution policies of the workload payload are associated with an attestation record, the selecting operation including evaluating the one or more trusted execution policies against the trusted execution platforms to identify one or more of the multiple trusted execution platforms satisfying the one or more trusted execution policies, the evaluating operation including decrypting the one or more trusted execution policies by the trusted execution broker and validating the one or more trusted execution policies by the trusted execution broker using the attestation record;
generating a brokered payload including executable trusted execution code and the input data;
communicating the brokered payload to the selected at least one of the multiple trusted execution platforms;
receiving a brokered result generated from the brokered payload by the selected at least one of the multiple trusted execution platforms; and
returning, to the source computing platform, a workload result based on the brokered result.

14. The one or more tangible processor-readable storage media of claim 13 wherein the one or more of the multiple trusted execution platforms includes the selected at least one of the multiple trusted execution platforms.

15. The one or more tangible processor-readable storage media of claim 13 wherein the selecting operation comprises:
communicating the one or more trusted execution policies to one of the trusted execution platforms designated as a trusted policy manager platform for evaluation of the one or more trusted execution policies by the trusted policy manager platform; and
receiving allocation instructions generated by the trusted policy manager platform, the allocation instructions identifying the selected at least one of the multiple trusted execution platforms selected in the selecting operation.

16. The one or more tangible processor-readable storage media of claim 13 wherein the generating operation comprises:
compiling the trusted execution code for execution by the selected at least one of the multiple trusted execution platforms.

17. The one or more tangible processor-readable storage media of claim 13 wherein the generating operation comprises:
selecting, based on the one or more trusted execution policies, one of the trusted execution platforms as a trusted compiler platform to compile the trusted execution code;

communicating the trusted execution code to the trusted compiler platform for compilation by the trusted compiler platform; and receiving executable code compiled by the trusted compiler platform for communication to and execution by the selected at least one of the multiple trusted execution platforms.

18. The one or more tangible processor-readable storage media of claim 17 wherein the trusted execution code of the workload payload is associated with the attestation record, and the trusted execution code is decrypted by the trusted compiler platform and is validated by the trusted compiler platform using the attestation record.

* * * * *